(12) United States Patent
Chan

(10) Patent No.: US 6,412,034 B1
(45) Date of Patent: Jun. 25, 2002

(54) TRANSACTION-BASED LOCKING APPROACH

(75) Inventor: Wilson Wai Shun Chan, San Mateo, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/293,360

(22) Filed: Apr. 16, 1999

(51) Int. Cl.[7] .................. G06F 12/00; G06F 13/22
(52) U.S. Cl. .............. 710/200; 710/220; 710/240
(58) Field of Search ................. 710/200, 220, 710/240, 241, 242, 243, 244; 709/1, 100, 101, 102, 103, 104, 105, 106; 707/8, 9, 1, 2, 3, 7

(56) References Cited

U.S. PATENT DOCUMENTS

| | | | |
|---|---|---|---|
| 5,117,352 A | * 5/1992 | Falek | 714/4 |
| 5,161,227 A | * 11/1992 | Dias et al. | 710/200 |
| 5,303,368 A | * 4/1994 | Kotaki | 710/200 |
| 5,485,607 A | * 1/1996 | Lomet et al. | 710/200 |
| 5,745,747 A | * 4/1998 | Chang et al. | 710/200 |

* cited by examiner

*Primary Examiner*—Peter Wong
*Assistant Examiner*—Tim Vo
(74) *Attorney, Agent, or Firm*—Hickman Palermo Truong & Becker LLP; Edward A. Becker

(57) ABSTRACT

According to a transaction-based locking approach, a request for a first lock on a particular resource is received from a first process, wherein the first process is associated with a first transaction. A first lock on the particular resource is granted to the first process. A request for a second lock on the particular resource is received from a second process. A determination is made whether the second process is associated with the first transaction. If the second process is associated with the first transaction, then a second lock on the particular resource is granted to the second process prior to the first lock being released.

18 Claims, 7 Drawing Sheets

TRANSACTION-BASED LOCKING APPROACH

FIELD OF THE INVENTION

The present invention relates to information systems, and more specifically, to an approach for providing access to resources in information systems.

BACKGROUND OF THE INVENTION

In information systems, processes require access to resources to perform work. As used herein, the term "resource" refers to any object that can be accessed in an information system. In a hardware context, examples of resources include, but are not limited to, printers, disk drives and memory. In a software context, examples of resources include, but are not limited to, data items and routines. In information systems it is often desirable to allow only one process at a time to access a particular resource to maintain consistency. For example, if while a first process is updating a particular resource, a second process is allowed to read from the particular resource, then the second process may read an intermediate value of the particular resource that is different than the final value of the particular resource after the first process has completed its updates. As a result, the second process may erroneously believe that at the time the second process read from the particular resource, that the particular resource reflected all of the changes made by the first process. In this situation, an inconsistency has been introduced into the information system with respect to the value of the particular resource, thereby compromising the integrity of the data on the information system.

To address situations such as this, various mechanisms are used to ensure the integrity of resources that can be accessed by multiple processes. In particular, some information systems use locking mechanisms to manage and coordinate access to shared resources. In such systems, each process may be required to obtain a lock on a resource before accessing the resource. The type and parameters of the lock determine the scope of the access rights granted to the obtaining process. The appropriate grant of locks to resources ensures compatible access to the resources by concurrent processes. In the previous example, the first process would request and be granted a lock on the particular resource prior to updating the particular resource. While the first process holds the lock on the particular resource, the first process may make updates to the particular resource, but the second process may not access the particular resource. Once the first process has completed updating the particular resource, the lock is released. The second process can then access the particular resource and see all of the updates made to the particular resource by the first process.

Locks are typically allocated and managed by a process referred to as a lock manager. Lock managers are responsible for maintaining data that specifies the status of locks for a set of resources. Lock managers sometimes maintain a lock request queue for a set of resources to manage multiple lock requests. In distributed computing systems, resources, their assigned lock managers and processes obtaining locks on the resources may be located on separate nodes, or may be located on the same node. As used herein, the term "node" refers to any type of computing entity. Thus, a single computer may be a single node or support multiple nodes.

One of the problems with locking mechanisms is that there are situations in which it is desirable to simultaneously grant locks to multiple processes for a particular resource. It is helpful to consider this problem in the context of transaction processing in database systems. In the context of database systems, a "transaction" is a logical unit of work that is comprised of one or more database language statements.

Consider a situation where a first process P1 processing a transaction T1 obtains an exclusive lock LI on a resource R from a lock manager LM. A second process P2, that is also working on transaction T1, wishes to obtain a lock on resource R and submits a lock request to lock manager LM. Since lock L1 on resource R is currently granted to process P1, lock manager LM places the lock request from the second process P2 onto a lock request queue maintained by lock manager LM. When first process P1 releases its lock L1 on resource R, lock manager LM grants a lock L2 on resource R to another process in the order in which lock requests were received. If the lock request by process P2 is the first lock request for resource R in the lock request queue, then lock manager grants a lock to process P2. If however, a lock request for resource R by a third process P3 was received prior to the request by the second process P2, then a lock on resource R will be granted to third process P3 before the second process P2, irrespective of whether the third process P3 is working on transaction T1. Thus, second process P2 may or may not be the next process to be granted a lock on resource R, even though process P2 is processing transaction T1. This characteristic of lock mechanisms is undesirable for several reasons.

Sometimes it is desirable to directly migrate a lock on resource R from the first process P1 to the second process P2 so that the second process P2 can immediately continue processing of transaction T1 without losing the changes made by process P1. If, as in the prior example, process P3 is granted a lock on resource R before process P2, and process P3 begins processing a transaction other than T1, then the changes made to resource R by process P1 may be lost. Direct migration is often desirable for load balancing or efficiency purposes. For example, the first process P1 may be experiencing an extremely high processing load that can be reduced by migrating the processing of transaction T1 from the first process P1 to the second process P2. Alternatively, the second process P2 may be able to process transaction T1 more efficiently than the first process P1.

Another situation where direct migration is desirable is when the first process P1 fails, or the node on which first process P1 resides fails, and it is possible for another process to complete processing of transaction T1. In this situation, sometimes referred to as "failover," it is important to continue processing of transaction T1 before a process working on another transaction makes a change to resource R. Otherwise, changes made to resource R up to the point of failure of the first process P1 may be lost. With conventional locking mechanisms however, there is no way to guarantee that the process that is to continue processing of transaction T1 will be the next process that is granted a lock on resource R when the first process P1 releases its lock on resource R.

Suppose that the first process P1 has failed before completing transaction T1 and that the second process P2 is to continue processing of transaction T1. At the time of failure of the first process P1, a lock request for a lock on resource R is sent by the second process P2 to lock manager LM and placed on the lock request queue. When the lock held by the first process P1 is released, the lock manager LM grants a lock on resource R to the process associated with the first lock request in the lock request queue. If the lock request associated with second process P2 is first in the lock request queue, then the first transaction T1 can be completed by the second process P2. If, however, a lock request associated with a third process P3 is ahead of the lock request associated with the second process P2 in the lock request queue, then the lock is granted to the third process P3 before the second process P2. If the third process P3 is working on a transaction other than transaction T1, then the third process P3 may make updates to resource R, causing the changes made to resource R by the first process P1 up to the point that the first process P1 failed, to be lost. In this event, the changes made during the processing of the first transaction T1 will have to be undone and the first transaction T1 started again.

Sometimes, the nature of the failure of either the first process P1, or the node on which the first process P1 resides, can make continued processing of transaction T1 by another process either impractical or impossible. In these situations, a recovery process must rollback the changes made by transaction T1 before other processes can access resource R. If another process accesses resource R before the recovery process rolls back the changes made by transaction T1, then the other process risks working with an invalid state of resource R. With conventional locking mechanisms, there is no way to ensure that a lock on resource R can be granted to the recovery process before being granted to another process.

Therefore, based on the need to control access to resources by processes and the limitations in the prior approaches, an approach for controlling access to resources that does not suffer from limitations inherent in conventional locking approaches is highly desirable.

SUMMARY OF THE INVENTION

According to one aspect of the invention a method is provided for managing access to a particular resource. According to the method, a request is received for a first lock on the particular resource from a first process to allow the first process to make updates to the particular resource, wherein the first process is associated with a first transaction. A first lock on the particular resource is granted to the first process. A request for a second lock on the particular resource is received from a second process to allow the second process to make updates to the particular resource. A determination is made whether the second process is associated with the first transaction. If the second process is associated with the first transaction, then a second lock is granted on the particular resource to the second process prior to the first lock being released.

According to another aspect of the invention, a system is provided that comprises a resource and a locking mechanism for managing access to the resource. The locking mechanism is configured to grant a first lock on the resource in response to a request for a first lock on the resource from a first process to allow the first process to make updates to the resource, wherein the first process is associated with a first transaction. The locking mechanism is further configured to determine, in response to a request for a second lock on the resource from a second process to allow the second process to make updates to the resource, whether the second process is associated with the first transaction. If the second process is associated with the first transaction, then a second lock on the resource is granted to the second process prior to the first lock being released.

According to another aspect of the invention, a method is provided for managing access to a resource. According to the method, a first request for a first lock on a resource is received from a first process associated with a first transaction to allow the first process to make updates to the resource. A first lock on the resource is granted to the first process. After granting the first lock on the resource to the first process, a second request for a second lock on the resource is received from a second process associated with a second transaction to allow the second process to make updates to the resource. After receiving the second request, a third request for a third lock on the resource is received from a third process associated with the first transaction to allow the third process to make updates to the resource. Finally, the third lock on the resource is granted to the third transaction prior to granting the second lock on the resource to the second transaction in response to the third process being associated with the same transaction as the first process.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Functional Overview

A novel transaction-based locking approach, according to an embodiment of the invention, generally involves allowing multiple processes that are associated with the same transaction to obtain simultaneous locks on a particular resource. The approach allows transaction processing to be directly migrated from one process to another and is particularly well suited for performing failover and recovery.

Figure 1:
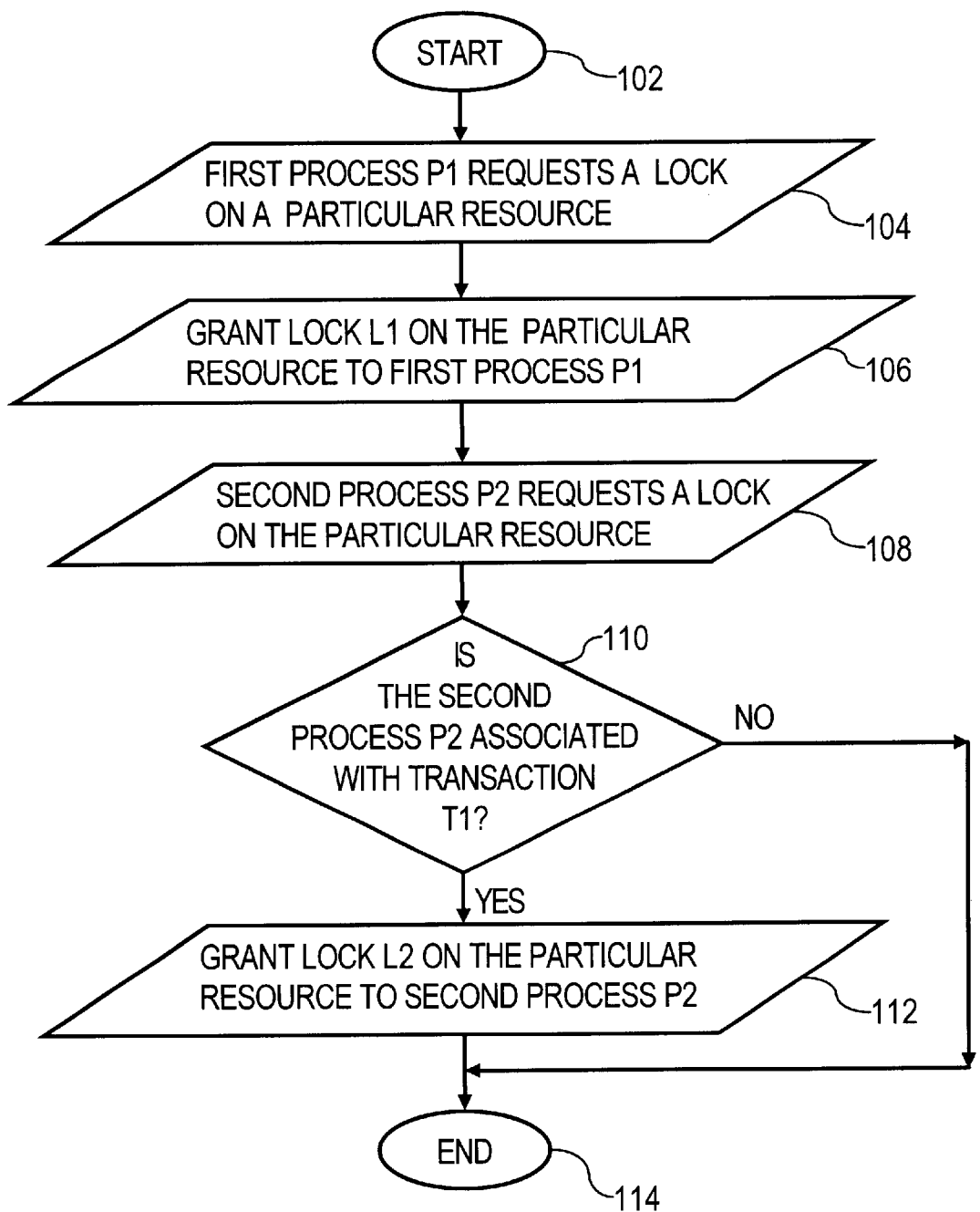
FIG. 1 is a flow chart illustrating a locking approach for controlling access to resources according to an embodiment of the invention.

FIG. 1 is a flow chart 100 illustrating a transaction-based locking approach according to an embodiment of the invention. After starting in step 102, in step 104, a first process P1, associated with a first transaction T1, requests a first lock on a particular resource so that the first process P1 can update the particular resource. At the time the first process P1 requests a lock on the particular resource, the first process P1 may or may not have started processing transaction T1. For purposes of this example, it is presumed that at the time the first process P1 requests a lock on the particular resource, that no other processes currently hold any locks on the particular resource. As used herein, a process "holds a lock" on a resource when the process has been granted a lock on the resource and not released the lock on the resource. As used herein, a process is "associated" with a particular transaction when the process has already processed, is currently processing or will process at least a portion of the particular transaction.

In step 106, a lock L1 on the particular resource is granted to the first process P1, allowing the first process P1 to update the particular resource. Some later time, in step 108, a second process P2 requests a lock on the particular resource. With conventional locking approaches, a lock would not be granted to process P2 since process P1 currently holds the lock L1 on the particular resource.

In accordance with an embodiment of the invention, in step 110, a determination is made whether the second process P2 is associated with the transaction, i.e. transaction T1. If so, then in step 112, a second lock L2 on resource R1 is granted to the second process P2. As a result, both the first and second processes P1 and P2 hold simultaneous locks, L1 and L2 respectively, on resource R1. Thus, the processing of transaction T1 can be directly and immediately transferred from the first process P1 to the second process P2.

If in step 110 a determination is made that the second process P2 is not associated with the transaction, i.e. transaction T1, then a lock on resource R1 is not immediately granted to the second process P2. In this circumstance, a lock on resource R1 is not granted to the second process P2 until the first process P1 releases the first lock L1 on the particular resource. The process is complete in step 114.

There are a variety of reasons why one process P2 associated with a transaction T1 might request a lock on a resource R1 held by another process P1 associated with the same transaction. For example, a determination may be made that it is desirable to directly migrate the processing of transaction T1 by the first process P1 to the second process P2. This determination may be made based upon, for example, load balancing, efficiency, failover or recovery considerations. The invention is not limited to any particular reason or motivation for migrating the processing of transaction T1 by the first process P1 to the second process P2. Since processing of transaction T1 necessarily requires access to resource R, the second process P2 will require a lock on resource R to process transaction T1.

Detailed Description

Figure 2A:
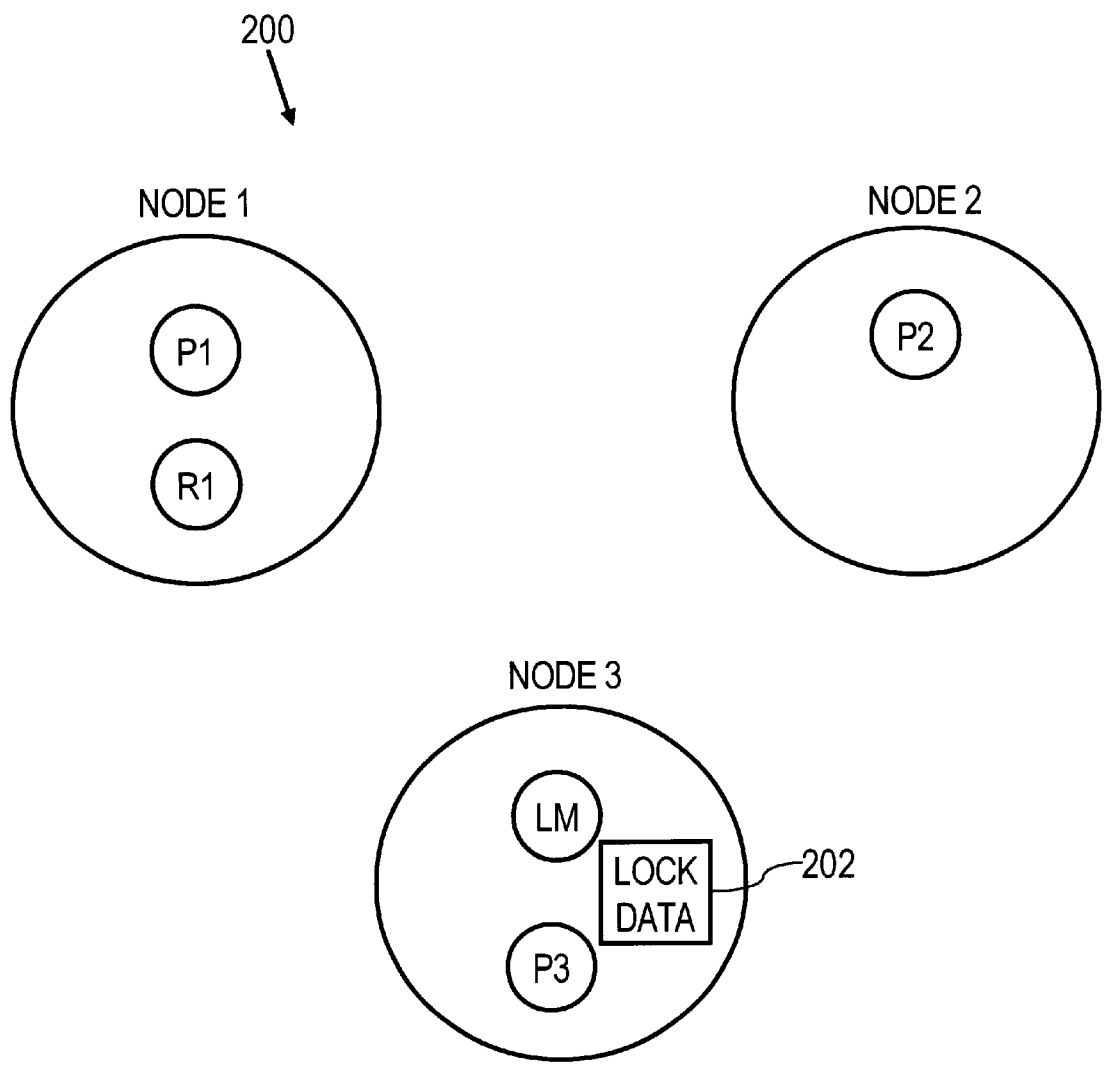
FIG. 2A is a block diagram illustrating a locking approach for controlling access to resources according to another embodiment of the invention.
Figure 2B:
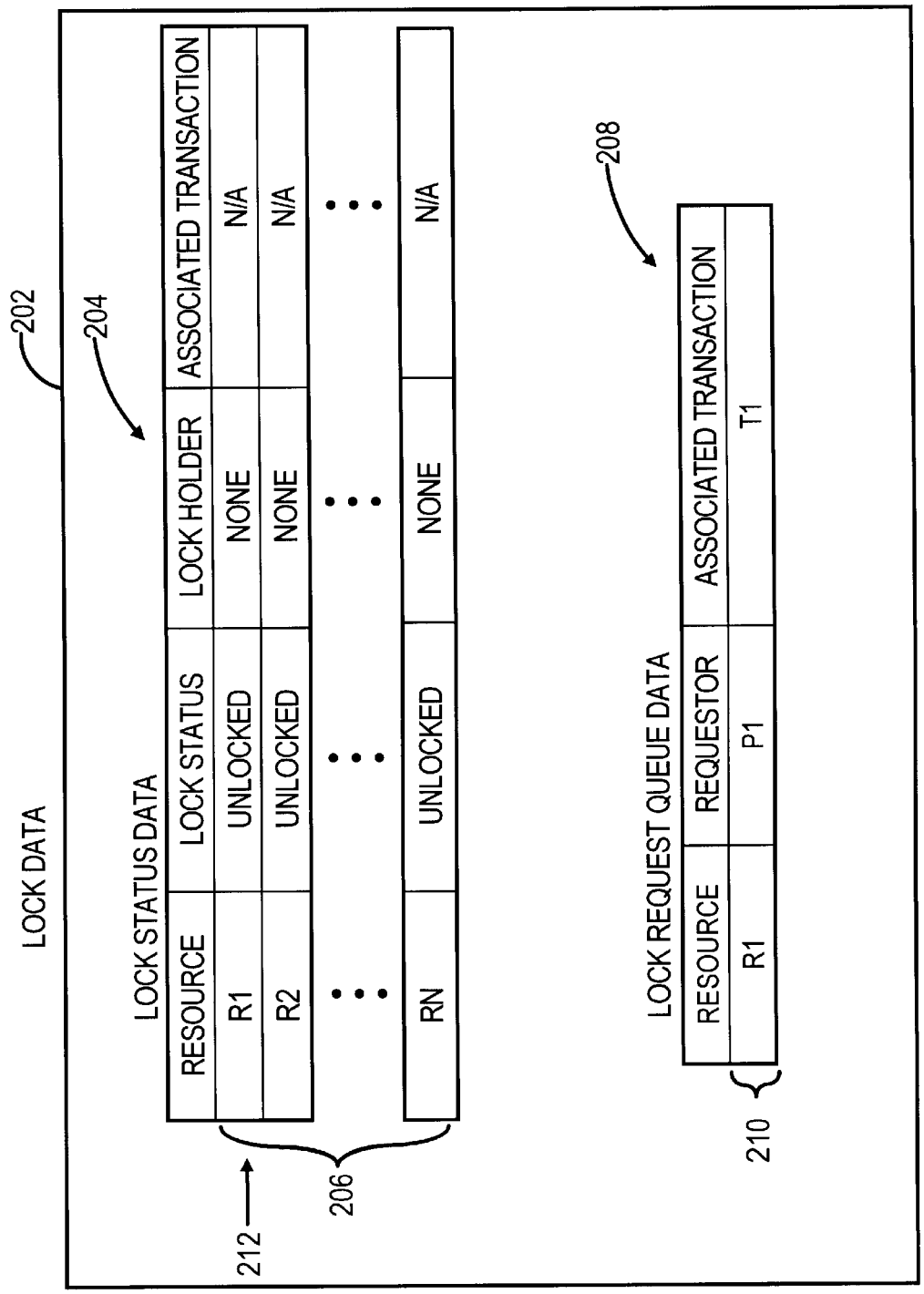
FIGS. 2B–2E are a set of block diagrams illustrating various states of lock data maintained by a mechanism implementing the approach of FIG. 1.

Various aspects and features of the invention are now described in more detail with reference to FIGS. 2A and 2B. FIG. 2A is a block diagram of an arrangement 200 in which a process P1 resides on a node NODE1 and is to process at least a portion of a transaction T1 that will require access to a resource R1 on node NODE1.

A lock manager LM resides on a node NODE3 and is responsible for allocating and managing locks for a set of resources that includes resource R1. Lock manager LM maintains lock data 202 for the set of resources assigned to lock manager LM. FIG. 2B is a block diagram illustrating the contents of lock data 202 according to an embodiment of the invention. Lock data 202 includes lock status data 204 that contains one or more entries 206. Each entry 206 corresponds to a particular resource ("R1, R2 . . . RN") assigned to lock manager LM and specifies a lock status for the particular resource, e.g. "LOCKED" or "UNLOCKED", a process, if any, currently holding a lock on the particular resource and a transaction with which the process is associated. As illustrated in FIG. 2B, lock manager LM is responsible for resources R1, R2 . . . RN, that are all currently "UNLOCKED." Lock data 202 also includes lock request queue data 208 that specifies the pending lock requests for resources R1, R2 . . . RN. Lock request queue data 208 includes one or more entries 210. Each entry 210 is associated with a pending lock request and specifies a particular resource for which a lock is being requested, the process requesting a lock on the particular resource and a transaction with which the requesting process is associated.

Since the processing of transaction T1 requires updating resource R1, process P1 requests a lock on resource R1 from lock manager LM. For purposes of this example, it is presumed that at the time process P1 requests a lock on resource R1 from lock manager LM, that no other processes currently hold locks on resource R1. As illustrated in FIG. 2B, lock request queue data 208 includes an entry corresponding to the lock request for resource R1 by process P1. Specifically, entry 210 indicates that process P1, associated with transaction T1, has requested a lock on resource R1. The associated transaction information for process P1 may be provided directly to lock manager LM by process P1 when process P1 requests the lock on resource R1. For example, according to one embodiment of the invention, the lock request from process P1 to lock manager LM contains data that specifies that process P1 is associated with transaction T1. Lock manager LM may also get this information from other sources, for example from a transaction manger. The invention is not limited to applications where lock manager LM receives the associated transaction information directly from a process requesting a lock on a resource assigned to lock manager LM.

Figure 2C:
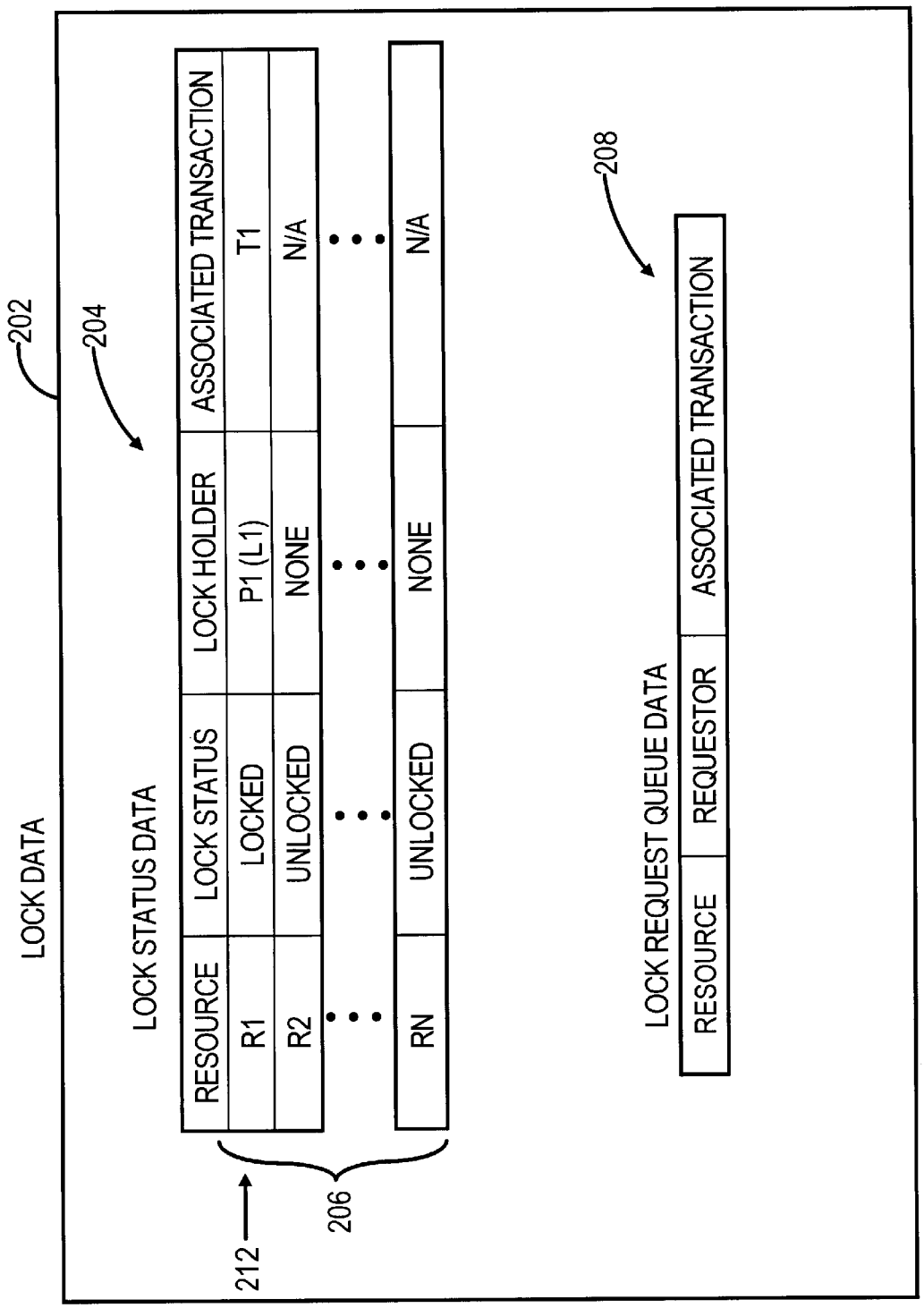

As part of its allocation and management functions, lock manager LM periodically reviews and updates lock data 202. In the present example, lock manager LM knows from lock request queue data 208 that process P1 has requested a lock on resource R1. Lock manager LM also knows from the lock status data 204, and in particular entry 212, that no processes currently hold a lock on resource R1. Accordingly, lock manager LM grants a first lock L1 to process P1 on resource R1. As illustrated in FIG. 2C, lock manager LM also updates entry 212 to reflect that process P1 holds a first lock L1 on resource Rl and that process P1 is associated with transaction T1. Lock manager LM also updates lock request queue data 208 to reflect that the lock request associated with entry 210 of FIG. 2B has now been processed. Process P1 can then process transaction T1 and access resource R1 as necessary.

Referring again to FIG. 2A, sometime later a determination is made that it is desirable to directly migrate the processing of transaction T1 that is being performed by process P1 to a process P2 that resides on a node NODE2. As previously described, this determination may be made for a variety of reasons including, but not limited to, load balancing, efficiency, failover or recovery considerations. Process P2 requires access to resource R1 to process transaction T1. Accordingly, process P2 requests a lock on resource R1 from lock manager LM while process P1 is still holding its lock L1 on resource R1.

Figure 2D:
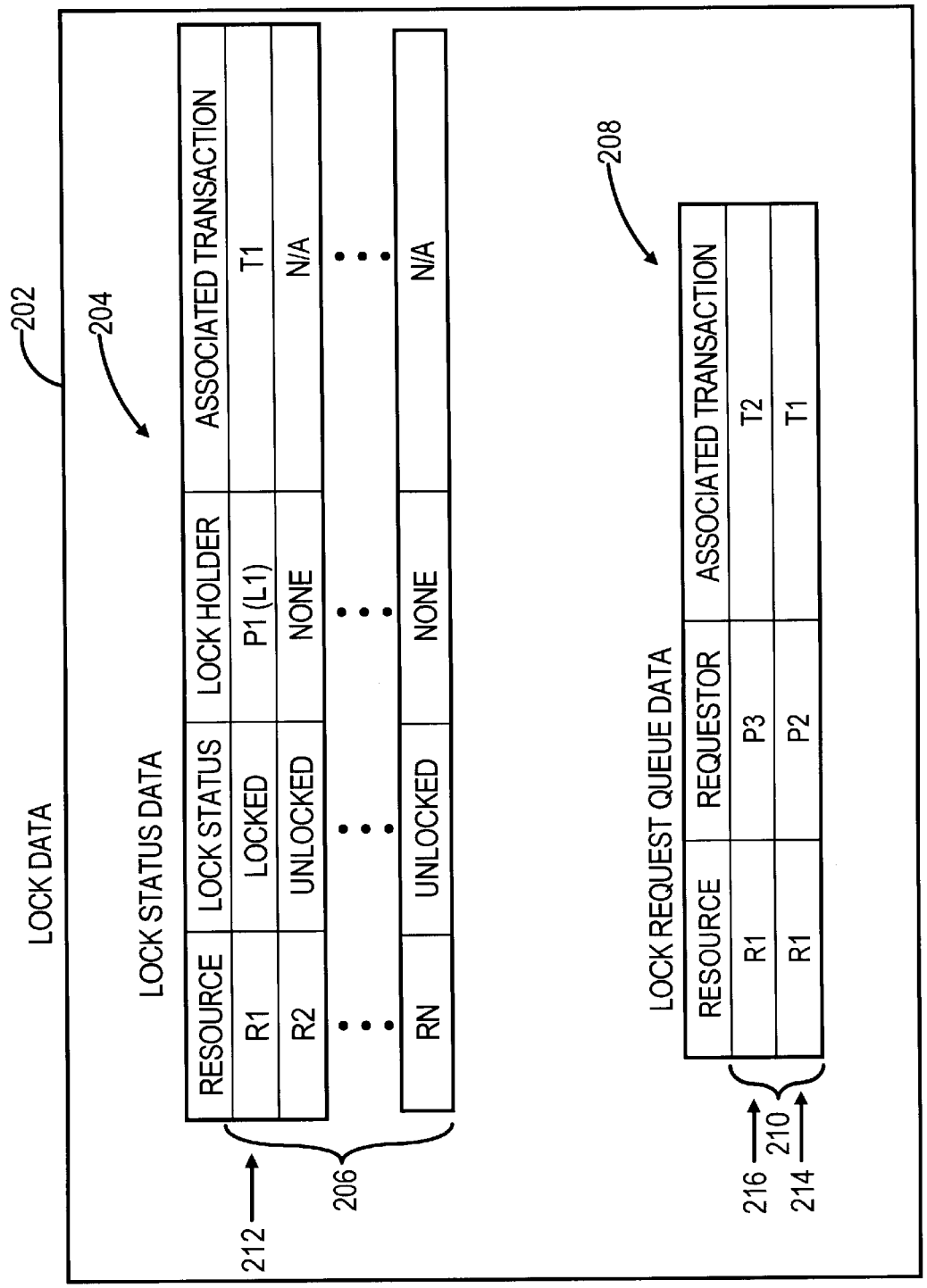

FIG. 2D illustrates the state of lock data 202 after process P2 has requested a lock on resource R1. Specifically, lock request queue data 208 includes an entry 214 that corresponds to the lock request by process P2 for resource R1. Entries 210 also include an entry 216 that corresponds to a lock request made by a process P3, associated with a transaction T2 and residing on a node NODE3 (FIG. 2A). In the present example, entry 216 is ahead of entry 214 in lock request queue data 208, indicating that the lock request by process P3 was received by lock manager LM prior to the lock request by process P2. In the present example, the relative timing of requests is indicated by the relative order of entries 210 in lock request queue data 208. Other approaches may also be used and the invention is not limited to any particular approach for indicating when lock requests are received by lock manager LM. For example, entries may include a timestamp to indicate when a particular lock request was received by lock manager LM.

Conventional locking approaches allow only a single process to hold a lock on a resource at any particular time. Furthermore, when a lock is release by a process for a particular resource, lock requests for the particular resource are conventionally serviced in the order in which they are received. Thus, according to conventional lock approaches, when process P1 releases its lock L1 on resource R1, a lock would be granted to process P3 before process P2 since the lock request from process P3 was received by lock manager LM prior to the lock request from process P2. Granting a lock to process P3 has the adverse consequence of preventing direct migration of the processing of transaction T1 from process P1 to process P2 since process P3 is associated with a different transaction, namely, transaction T2. As a result, changes made to resource R1 by process P1 may be corrupted or lost completely.

In accordance with an embodiment of the invention, multiple, simultaneous locks on the same resource are granted to different processes that are associated with the same transaction to allow for direct migration of transaction processing from one process to another process. In the present example, even though process P1 holds lock L1 on resource R1, lock manager LM examines entries 210 to determine if any of the processes that have pending lock requests for resource R1 are associated with the same transaction, i.e. T1, as process P1. Since process P2 has requested a lock on resource R1 and process P2 is associated with transaction T1, lock manager LM grants a second lock L2 on resource R1 to process P2. The grant of lock L2 to process P2 is made even though (1) process P1 currently holds lock L1 on resource R1 and (2) the lock request from process P3 was made prior to the lock request by process P2.

Figure 2E:
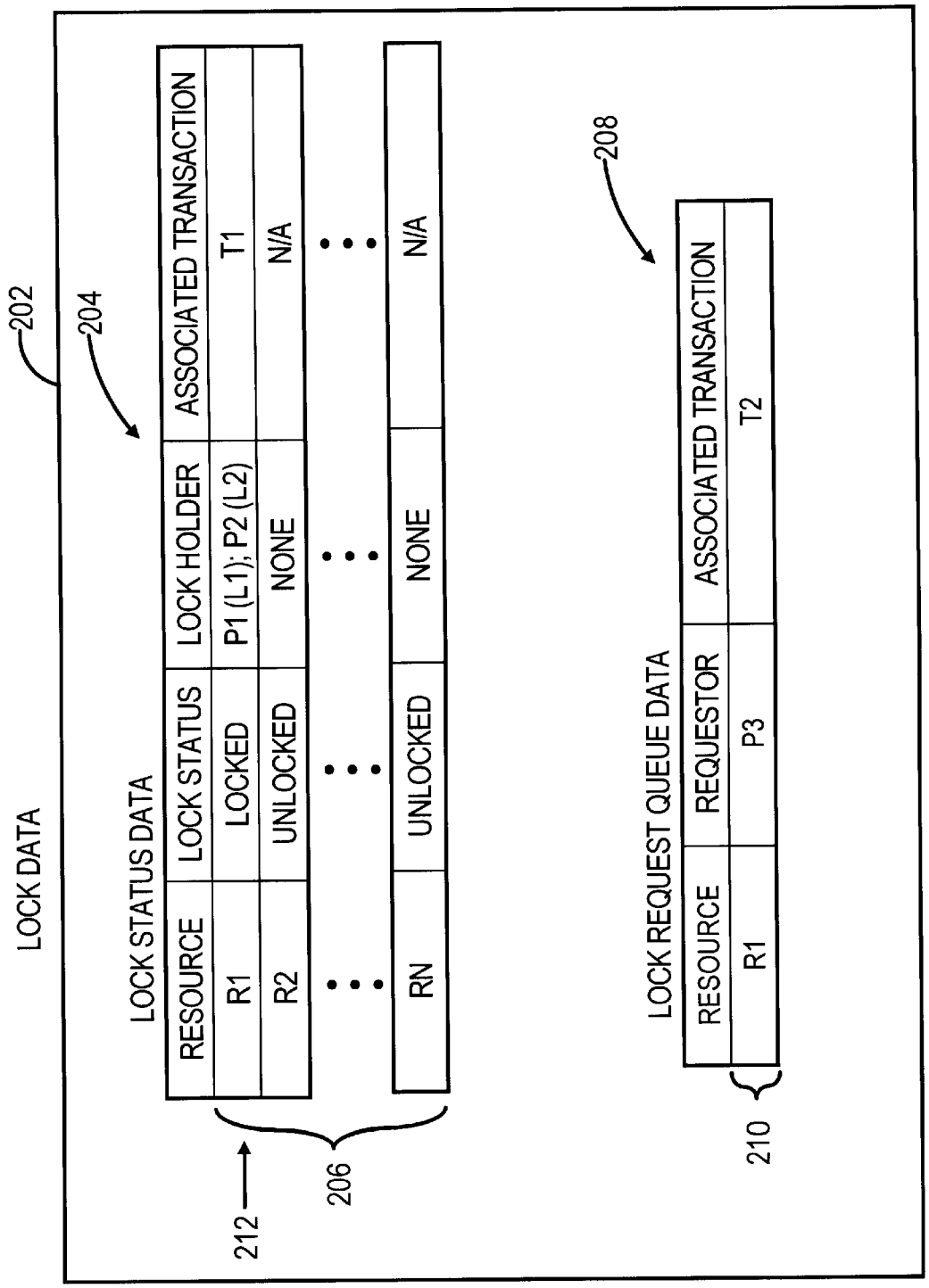

As illustrated by FIG. 2E, lock data 202 has been updated by lock manager LM to reflect that both processes P1 and P2 have locks (L1 and L2) on resource R1 simultaneously since they are both associated with transaction T1 and the lock request by process P3 remains pending. This approach allows the processing of transaction T1 by process P1 to be directly migrated to process P2 while preserving any changes made to resource R1 by process P1. Lock L1 may be released any time after lock L2 has been granted to process P2. For example, lock Li may be released immediately after lock L2 has been granted to process P2 or may be released later when lock L2 is released after process P2 completes its processing of transaction T1.

The transaction-based lock approach described herein is applicable to any type of database system including for example, but not limited to, distributed database systems and parallel processing database systems.

Although embodiments of the invention have been described herein in the context of two process holding locks on a single resource simultaneously, embodiments of the invention are applicable to any number of processes holding locks on a single resource simultaneously. For example, referring again to FIG. 2A, a fourth process P4 (not illustrated) associated with transaction T1, could request and be granted a lock L3 on resource R1, simultaneous to locks L1 and L2 granted to processes P1 and P2, respectively.

The transaction-based locking approach described herein may be implemented on a transaction-by-transaction basis. According to one embodiment of the invention, the first process to begin processing a transaction notifies the lock manager that transactionbased locking is desired. The lock manager then provides direct migration of transaction processing for failover and recovery as described herein if any of the processes (or their respective nodes) working on the transaction fail.

Referring to the prior example, when process P1 requests a lock on resource R1, process P1 notifies lock manager LM that transaction-based locking is desired. Then if process P1 cannot complete its processing of transaction T1, the processing of transaction T1 is directly migrated to process P2 as described herein.

According to another embodiment of the invention, if direct migration of the transaction processing to another process is desired, then the process that is currently processing the transaction notifies the lock manager before that process releases its lock on the resource, so that the lock manager will directly migrate the processing of the transaction to another process. In the prior example, when processing of transaction T1 is to be migrated from process P1 to process P2, process P1 notifies lock manager LM that transaction based locking is desired. When process P1 releases its lock on resource R1, lock manager LM holds lock L1 open until lock L2 is granted to process P2 as described herein.

In some situations when process migration for transaction T1 is desired, lock manager LM may not find a request for a lock on resource R1 from another process associated with transaction T1. For example, lock request data 208 may contain only data associated with a request for a lock on resource R1 by process P3, associated with transaction T2. According to one embodiment of the invention, lock manager LM waits a specified period of time and, after the specified period of time has elapsed, grants a lock on resource R1 to process P3. If another process then requests a lock on resource R1, it must wait until process P3 has released its lock on resource R1.

Implementation Mechanisms

The locking approach described herein may be implemented in hardware circuitry, in computer software, or a combination of hardware circuitry and computer software. For example, the approach may be implemented as a locking mechanism residing on a database system.

Figure 3:
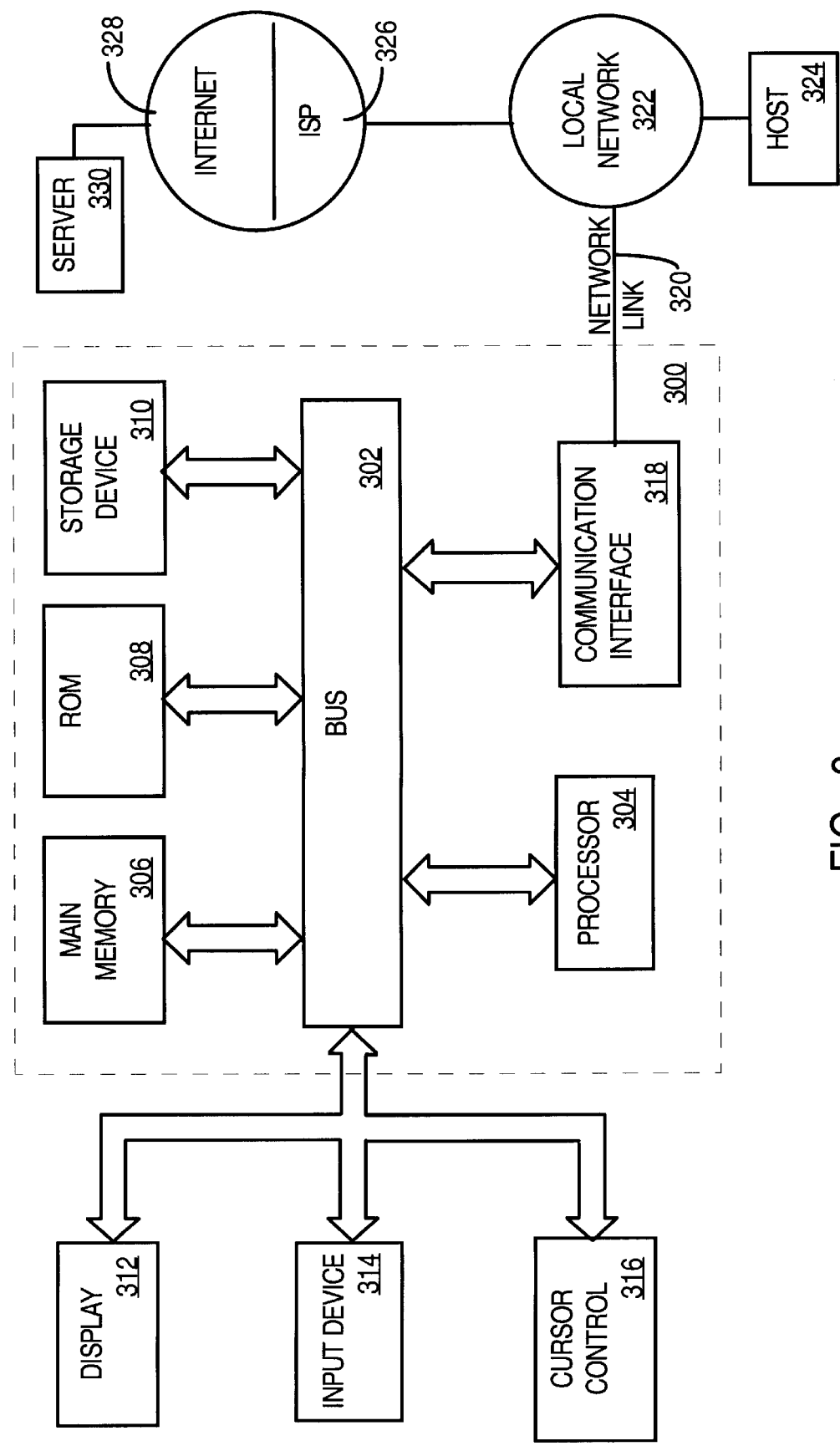
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing a transaction-based locking approach. According to one embodiment of the invention, a transaction-based locking approach is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides a transaction-based locking approach as described herein.

The received code may be executed by processor 304 as it is received, and/or stored in storage device 310, or other non-volatile storage for later execution. In this manner, computer system 300 may obtain application code in the form of a carrier wave.

The transaction-based locking approach described herein provides several advantages over prior locking approaches. First, processes working on the same transaction can be granted simultaneous locks on the same resource, which allows transaction processing to be directly migrated from one process to another process. This eliminates the risk that a lock will be granted to a process that is processing a different transaction. For example, it may be desirable to directly migrate transaction processing from one process to another process when load balancing or efficiency considerations dictate that it is desirable to migrate transaction processing to another process. It may also be desirable to directly migrate transaction processing from one process to another process to perform transaction failover or transaction recovery.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A method for managing access to a particular resource, the method comprising the steps of:

receiving a request for a first lock on the particular resource from a first process to allow the first process to make updates to the particular resource, wherein the first process is associated with a first transaction;

granting a first lock on the particular resource to the first process;

receiving a request for a second lock on the particular resource from a second process to allow the second process to make updates to the particular resource;

determining whether the second process is associated with the first transaction; and if the second process is associated with the first transaction, then granting a second lock on the particular resource to the second process prior to the first lock being released.

2. The method as recited in claim 1, further comprising the step of the first process starting processing of the first transaction prior to the second process sending the request for the second lock on the particular resource.

3. The method as recited in claim 1, wherein:

the request for a second lock on the particular resource from the second process includes data that specifies a transaction with which the second process is associated, the step of determining whether the second process is associated with the first transaction includes examining the data contained in the request from the second process.

4. The method as recited in claim 2, wherein:

the first process stops processing the first transaction before the first transaction is completed, and the method further includes the step of the second process completing processing of the first transaction.

5. The method as recited in claim 2, wherein:

the first process terminates prematurely prior to completing processing of the first transaction, and the method further includes the step of the second process completing processing of the first process.

6. The method as recited in claim 2, wherein:

the first process terminates prematurely prior to completing processing of the first transaction, and the method further includes the step of the second process undoing changes made to the particular resource by the first process that were made as part of the first transaction.

7. A system comprising:

a resource; and a locking mechanism for managing access to the resource, wherein the locking mechanism is configured to grant a first lock on the resource in response to a request for a first lock on the resource from a first process to allow the first process to make updates to the resource, wherein the first process is associated with a first transaction, determine, in response to a request for a second lock on the resource from a second process to allow the second process to make updates to the resource, whether the second process is associated with the first transaction, and if the second process is associated with the first transaction, then grant a second lock on the resource to the second process prior to the first lock being released.

8. The system as recited in claim 7, wherein the first process starts processing of the first transaction prior to receipt of the request for a second lock on the resource from the second process.

9. The system as recited in claim 7, wherein:

the request for a second lock on the resource from the second process includes data that specifies a transaction with which the second process is associated, the locking mechanism is further configured to examine the data contained in the request from the second process.

10. The system as recited in claim 8, wherein:

the first process stops processing the first transaction before the first transaction is completed, and the second process completes processing of the first transaction.

11. The system as recited in claim 8, wherein:

the first process terminates prematurely prior to completing processing of the first transaction, and the second process completes processing of the particular work.

12. The system as recited in claim 8, wherein:

the first process terminates prematurely prior to completing processing of the first transaction, and the second process undoes changes made to the resource by the first process while the first process was processing the first transaction.

13. A computer-readable medium carrying one or more sequences of one or more instructions for managing access to a particular resource, the one or more sequences of one or more instructions including instructions which, when executed by one or more processors, cause the one or more processors to perform the steps of:

receiving a request for a first lock on the particular resource from a first process to allow the first process to make updates to the particular resource, wherein the first process is associated with a first transaction;

granting a first lock on the particular resource to the first process;

receiving a request for a second lock on the particular resource from a second process to allow the second process to make updates to the particular resource;

determining whether the second process is associated with the first transaction; and if the second process is associated with the first transaction, then granting a second lock on the particular resource to the second process prior to the first lock being released.

14. The computer-readable medium as recited in claim 13, further comprising the step of the first process starting processing of the first transaction prior to the second process sending the request for the second lock on the particular resource.

15. The computer-readable medium as recited in claim 13, wherein:

the request for a second lock on the particular resource from the second process includes data that specifies a transaction with which the second process is associated, the step of determining whether the second process is associated with the first transaction includes examining the data contained in the request from the second process.

16. The computer-readable medium as recited in claim 14, wherein:

the first process stops processing the first transaction before the first transaction is completed, and the computer-readable medium further includes instructions which, when executed by the one or more processors, cause the one or more processors to perform the step of the second process completing processing of the first transaction.

17. The computer-readable medium as recited in claim 14, wherein:

the first process terminates prematurely prior to completing processing of the first transaction, and the computer-readable medium further includes the step of the second process completing processing of the first process.

18. The computer-readable medium as recited in claim 14, wherein:

the first process terminates prematurely prior to completing processing of the first transaction, and the computer-readable medium further includes instructions which, when executed by the one or more processors, cause the one or more processors to perform the step of the second process undoing changes made to the particular resource by the first process that were made as part of the first transaction.

* * * * *